United States Patent
Tin

(10) Patent No.: US 7,148,902 B2
(45) Date of Patent: Dec. 12, 2006

(54) COLOR CHARACTERIZATION OF PROJECTORS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 10/956,445

(22) Filed: Oct. 1, 2004

(65) Prior Publication Data

US 2006/0071937 A1    Apr. 6, 2006

(51) Int. Cl.
 *G09G 5/02* (2006.01)
(52) U.S. Cl. .................................. 345/603; 345/604
(58) Field of Classification Search .................. None
See application file for complete search history.

(56) References Cited

U.S. PATENT DOCUMENTS

| | | | | |
|---|---|---|---|---|
| 4,843,573 | A * | 6/1989 | Taylor et al. ............... | 345/591 |
| 4,875,032 | A * | 10/1989 | McManus et al. .......... | 345/603 |
| 5,276,436 | A * | 1/1994 | Shaw et al. ................. | 345/603 |
| 5,579,031 | A * | 11/1996 | Liang ......................... | 345/604 |
| 6,256,073 | B1 | 7/2001 | Pettit ........................... | 348/743 |
| 6,707,938 | B1 | 3/2004 | de Queiroz et al. ........ | 382/162 |
| 6,844,881 | B1 * | 1/2005 | Chen et al. .................. | 345/589 |
| 6,870,955 | B1 * | 3/2005 | Lee et al. .................... | 382/165 |
| 2003/0128872 | A1 | 7/2003 | Lee et al. .................... | 382/162 |

OTHER PUBLICATIONS

"DLP Projectors overview: Digital projectors with mirror technology." http://www.dlp.com_technology/dlp_technology_overview.asp, Aug. 27, 2004.
Maureen C. Stone, "Color Balancing Experimental Projection Displays", IS&T/SID Ninth Color Imaging Conference, pp. 342-347.
Greg Pettitt, et al., "DLP Cinema™ Technology: Color Management and Signal Processing", IS&T/SID Ninth Color Imaging Conference, pp. 348-345.
Lars Seime, et al., "Characterisation of LCD and DLP Projection Displays", IS&T/SID Tenth Color Imaging Conference, pp. 277-282.
David R. Wyble, et al., "Colorimetric Characterization Model for DLP™ Projectors", IS&T/SID Eleventh Color Imaging Conference, pp. 346-350.
Geoff J. Woolfe, et al., "An Improved Method for CRT Characterization Based on Spectral Data", CIE Expert Symposium '97 on Colour Standards for Imaging Technology, 1997.
Henry R. Kang, "Color Display Systems", Color technology for electronic imaging devices, 1997, pp. 342-348.

* cited by examiner

*Primary Examiner*—Mark Zimmerman
*Assistant Examiner*—Kevin Xu
(74) *Attorney, Agent, or Firm*—Fitzpatrick, Cella, Harper & Scinto

(57) ABSTRACT

The present invention transforms a device-dependent color value in a device-dependent color space of a display device to a device-independent color value in a device-independent color space. A first color value is determined in a perceptually linear color space by applying a matrix model to the device-dependent color value, the matrix model applying a tone curve correction and a tristimulus matrix to the device-dependent color value. A difference value is then determined in the perceptually linear color space, wherein the difference value is determined by applying a difference model to the device-dependent color value, and wherein the difference model models deviation of the matrix model from actual measurements of the display device. Next, the difference value and the first color value are added and the sum is transformed to the device-independent color space. Because the first value based on the matrix model is added to a difference value which accounts for deviation of the matrix model, the present invention can account for the channel interdependency prevalent in DLP display devices.

11 Claims, 5 Drawing Sheets

COLOR CHARACTERIZATION OF PROJECTORS

BACKGROUND OF THE INVENTION

1. Field of the Invention

This invention relates to the field of color characterization, and specifically relates to transforming a device-dependent color value in a device-dependent color space of a display device to a device-independent color value in a device-independent color space, wherein the transformation accounts for the channel interdependency prevalent in digital light processing (DLP) technology.

2. Description of the Related Art

Typically, display devices such as liquid crystal displays (LCDs) and cathode-ray tubes (CRTs) produce colors on a screen by combining different amounts of red, blue and green (RGB) light. The actual color produced from specific combinations of RGB light varies from display device to display device. Therefore, in order to consistently reproduce colors on different devices, manufacturers of display devices create device profiles that characterize the output of a particular display device in terms of a standard color coordinate system. For instance, the CIEXYZ color space is often used.

Display devices based on CRT or LCD technology typically exhibit channel independence, in which each of the RGB channels function independently or nearly independently of each other for color characterization. Because they exhibit channel independence, CRT and LCD display devices have been successfully modeled by a so-called "standard matrix model." In the standard matrix model, RGB values are mapped to XYZ values by adjusting the RGB values according to generally non-linear tonal values (tone curves) and applying a tristimulus matrix to the adjusted RGB values, as follows:

$$R' = \gamma_r(R)$$
$$G' = \gamma_g(G)$$
$$B' = \gamma_b(B)$$

$$\begin{pmatrix} X \\ Y \\ Z \end{pmatrix} = S \begin{pmatrix} R' \\ G' \\ B' \end{pmatrix} + \begin{pmatrix} X_{bkpt} \\ Y_{bkpt} \\ Z_{bkpt} \end{pmatrix}$$

where R', G' and B' represent radiometric scalars obtained by transfer functions $\gamma_r(R)$, $\gamma_g(G)$ and $\gamma_b(B)$, and where $X_{bkpt}$, $Y_{bkpt}$ and $Z_{bkpt}$ are the components of the XYZ measurement of the blackpoint. S represents a tristimulus matrix as follows:

$$S = \begin{pmatrix} X^c_{r,max} & X^c_{g,max} & X^c_{b,max} \\ Y^c_{r,max} & Y^c_{g,max} & Y^c_{b,max} \\ Z^c_{r,max} & Z^c_{g,max} & Z^c_{b,max} \end{pmatrix}$$

where superscript c represents a black-corrected measurement, where subscripts r, g, and b denote the channel, and max denotes a color ramp point with a maximum device value. The standard matrix model assumes channel independence, and therefore this model is a good fit for characterizing CRT and LCD display devices.

Display devices using DLP technology, however, exhibit channel interdependency, in which the RGB channels do not function independently of each other. There are two primary reasons why channel independence fails for such devices. First, color management in the form of nonlinear 3D look-up-table (LUT) may be implemented in the hardware of the DLP display device in order to overcome artifacts (e.g. Abney Effect) due to the response of the human visual system. In addition, in the case where a white filter is present in the DLP display device, an internal fourth (white) channel is generated to enhance the luminance significantly in addition to the contribution from the RGB channels, thus invalidating an additivity assumption that would be a consequence of channel independence.

Since DLP devices exhibit channel interdependency, and since the standard matrix model assumes channel independence, the standard matrix model alone does not adequately characterize DLP display devices.

In addition to the standard matrix model, other models have been developed for characterizing display devices. For example, one model uses an intercepting LUT between the tone curves and the tristimulus matrix in order to model channel interaction of display devices that exhibit channel interdependency (see Woolfe, Geoff J. et al, *an Improved Method for CRT Characterization Based on Spectral Data*, Proceedings of CIE Expert Symposium 1997 on Colour Standards for Imaging Technology). However, this model fails to consider the effect of a white filter often present in DLP display devices. Another model applies a white scalar to compensate for the presence of a white filter, but this model does not necessarily account for the channel interdependency found in DLP display devices (see Wyble, David R. and Zhang, Hongqin, *Colorimetric Characterization Model for DLP Projectors*, Proceedings of IS&T/SID Eleventh Color Imaging Conference).

SUMMARY OF THE INVENTION

The present invention addresses the foregoing problems when transforming values from a device-dependent color space to a device-independent color space for devices like DLP display devices that exhibit channel interdependency. In particular, the invention combines the output of the standard matrix model with the output of a difference model which models deviation of the standard matrix model from actual measurements of the display device.

In one aspect, the present invention transforms a device-dependent color value in a device-dependent color space of a display device to a device-independent color value in a device-independent color space. A first color value is determined in a perceptually linear color space by applying a matrix model to the device-dependent color value, the matrix model applying a tone curve correction and a tristimulus matrix to the device-dependent color value. A difference value is then determined in the perceptually linear color space, wherein the difference value is determined by applying a difference model to the device-dependent color value, and wherein the difference model models deviation of the matrix model from actual measurements of the display device. The difference value and the first color value are added and the sum is transformed to the device-independent color space.

Preferably, the difference model comprises a look-up table (LUT), and the difference value is determined based on linear interpolation of values in the LUT. The values in the LUT are preferably non-uniformly spaced corresponding to non-uniformly spaced actual measurements of the display device.

The application of the matrix model preferably provides a color value in the device-independent color space, which is transformed to the first color value in the perceptually linear color space. The device-independent color space is preferably CIEXYZ, and the perceptually linear color space is preferably CIELUV. The display device preferably exhibits channel interdependency, such that color channels of the device-dependent color value function interdependently during transformation from the device-dependent color value to the device-independent color value. In addition, the display device is preferably a projector.

Because the present invention combines the output of the standard matrix model with the output of a difference model which models deviation of the standard matrix model from actual measurements of the display device, the present invention can account for the channel interdependency prevalent in DLP display devices.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 3:
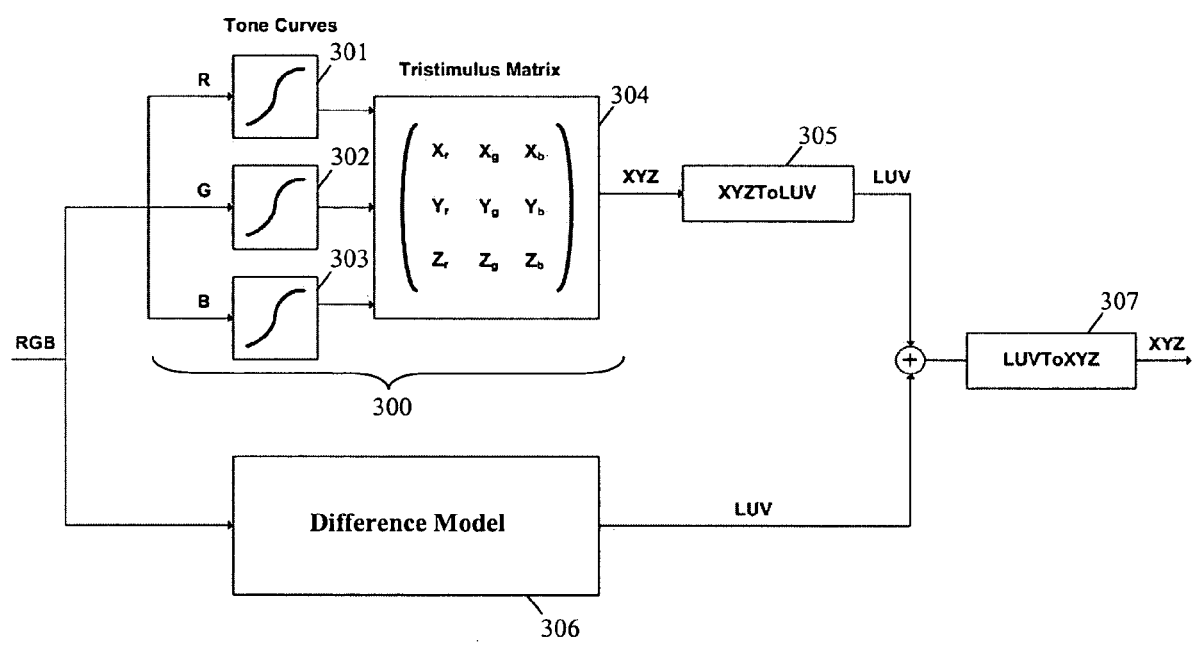
FIG. 3 is a color transformation model according to one embodiment of the present invention.

The color transformation model of the present invention transforms a color value in a device-dependent color space, such as RGB, to a color value in a device-independent color space, such as XYZ. As seen in FIG. 3, a first color value is determined by applying a standard matrix model 300 to the RGB value. Standard matrix model 300 applies a tone curve correction, in the form of tone curves 301, 302 and 303, and a tristimulus matrix 304 to the RGB value. The output of the standard matrix model 300, which is in the XYZ color space, is converted via converter 305 to a perceptually linear space. In the preferred embodiment, the perceptually linear color space is the Luv color space.

In addition to determination of the first color value, a difference value is determined in the Luv space by applying difference model 306 to the RGB value. Difference model 306 models the deviation of standard matrix model 306 from actual measurements of display device. The difference value and the first color value are then added and the sum is transformed via converter 307 to the device-independent color space of XYZ. Because the first value based on standard matrix model 300 is added to a difference value based on difference model 306, which models deviation of standard matrix model 300, the channel interdependency prevalent in DLP display devices is accounted for.

In the preferred embodiment, the difference model 306 is implemented as a sparsely-populated lookup table (LUT), for which interpolation is performed based on an input RGB value so as to obtain an output Luv value.

The color transformation model of the present invention can be utilized by a color management module (CMM) contained in a device driver or computer operating system, to convert device-independent color values into device-dependent color values usable by the display device. The transformation from the device-independent color space back into the device-dependent color space is known as inversion. In the preferred embodiment, since the color transformation model transforms color values from the RGB color space to the XYZ color space, which are both three dimensional, inversion is equivalent to solving three non-linear equations in three unknowns. There are a number of techniques for performing inversion of the color transformation model, such as the one described in U.S. patent application Ser. No. 10/840,307, entitled "Color Characterization With Enhanced Purity", the contents of which are incorporated by reference.

Figure 1:
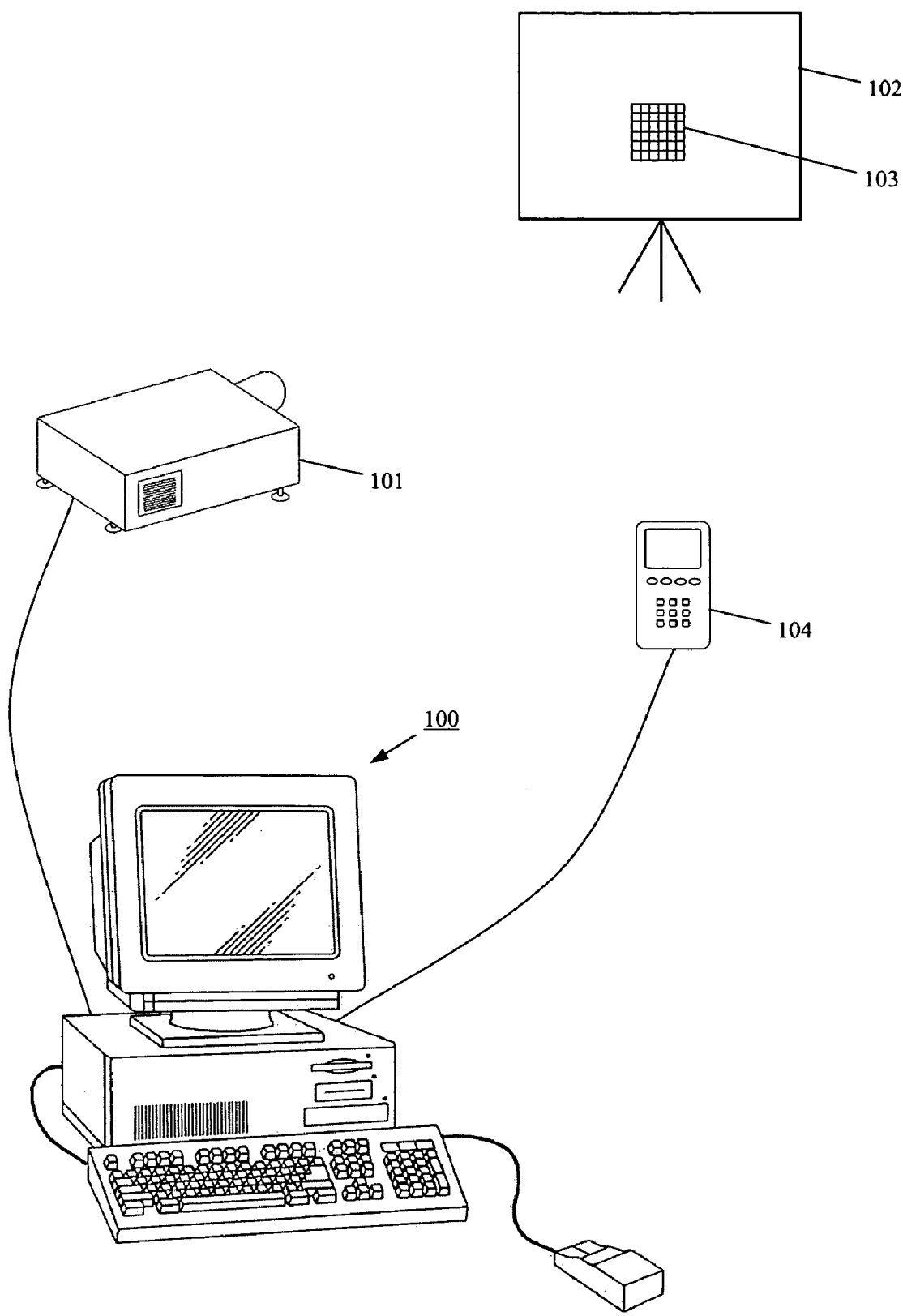
FIG. 1 is a representative view of an apparatus for sampling measurement data of a display device.

In order to construct the color transformation model, a sufficient sampling of measurement data should first be performed. Referring to FIG. 1, a representative view of an apparatus for sampling measurement data of a display device is shown. Computing equipment 100 interfaces with a display device 101 and a color measuring device 104. In the preferred embodiment, display device 101 is a DLP display device which exhibits channel interdependency. One such device is a projector based on the DLP™ technology by Texas Instruments, which in turn utilizes the Digital Mirror Device™ chip, also by Texas Instruments.

Presuming the device-dependent color space of display device 101 is RGB, computing equipment 100 is used to supply RGB values to display device 101. Computing equipment 100 controls display device 101 in order to display supplied RGB values onto a display screen 102 as a color patch 103. Color measuring device 104 is used to measure device-independent color values corresponding to the colors within color patch 103. Color measuring device 104 can be a spectroradiometer or a colorimeter, or any other color measuring device that is capable of measuring colors and outputting the measurements to a device-independent color space, such as CIEXYZ.

In order to obtain sufficient sampling data for display device 101 without performing extensive measurements (i.e. a comprehensive 9×9×9=729 sampling points), it is noted that when an RGB value is small, the output of display device 101 tends to follow the standard matrix model 300 very closely. The reason for close adherence to the standard matrix model 300 is two-fold. First, any correction (e.g., for the Abney Effect) implemented in hardware of display device 101 typically has significant effect only for saturated colors. Second, if a white filter is present in display device 101, the white channel will generally activate after a certain threshold device value is reached.

Since standard matrix model 300 performs well for lower values, the output of display device 101 can be sampled non-uniformly, with less emphasis in the low device value range. In the preferred embodiment, five sampling points in each channel are sufficient, including 0, x and 255, where x is a chosen threshold. Assuming that no prior knowledge of the internals of display device 101 is known, x may be set to 128, and the remaining two points are set to lie within the range between x and 255. In the preferred embodiment, the choice of the sampling grid in each of the R, G and B channels is as follows:

0, 128, 160, 224, 255 thus utilizing 5×5×5=125 measurements. However, if prior knowledge of the threshold is known, the threshold and remaining measurement points can be assigned accordingly. To obtain each of the five measurements, computing equipment 100 controls display device 101 to display the RGB values onto display screen 102 as color patch 103. Color patch 103 is then measured by color measuring device 104 and each RGB value within color patch 103 is assigned a corresponding XYZ value.

In addition, sampling points are obtained for each of the RGB ramps, so as to characterize tonality. To achieve characterization which captures the S-shaped, or sigmoidal tone curves for each tonal ramp, it is recommended to have sufficient points (at least 9) per ramp. In the preferred embodiment, an additional 4×3=12 measurements are made as follows:

R=32, 64, 96, 192, G=B=0
G=32, 64, 96, 192, R=B=0
B=32, 64, 96, 192, R=G=0

Therefore, the total number of measurements made in the preferred embodiment is 125+12=137.

In the preferred embodiment, the above measurements are taken by the manufacturer of a display device or a third party creating a color profile for the display device, and the measurement results are stored in the form of pairs of RGB device values and their corresponding XYZ measurements in a computer file called a "measurement only profile", or MOP. The MOP, in turn, is provided to an end user in order to construct the color transformation model of the display device.

Although this embodiment involves use of an MOP by the end user, it is also possible for the color transformation model and inverse model to be constructed by the manufacturer of the display device, with only the end results being provided to the end user.

Figure 2:
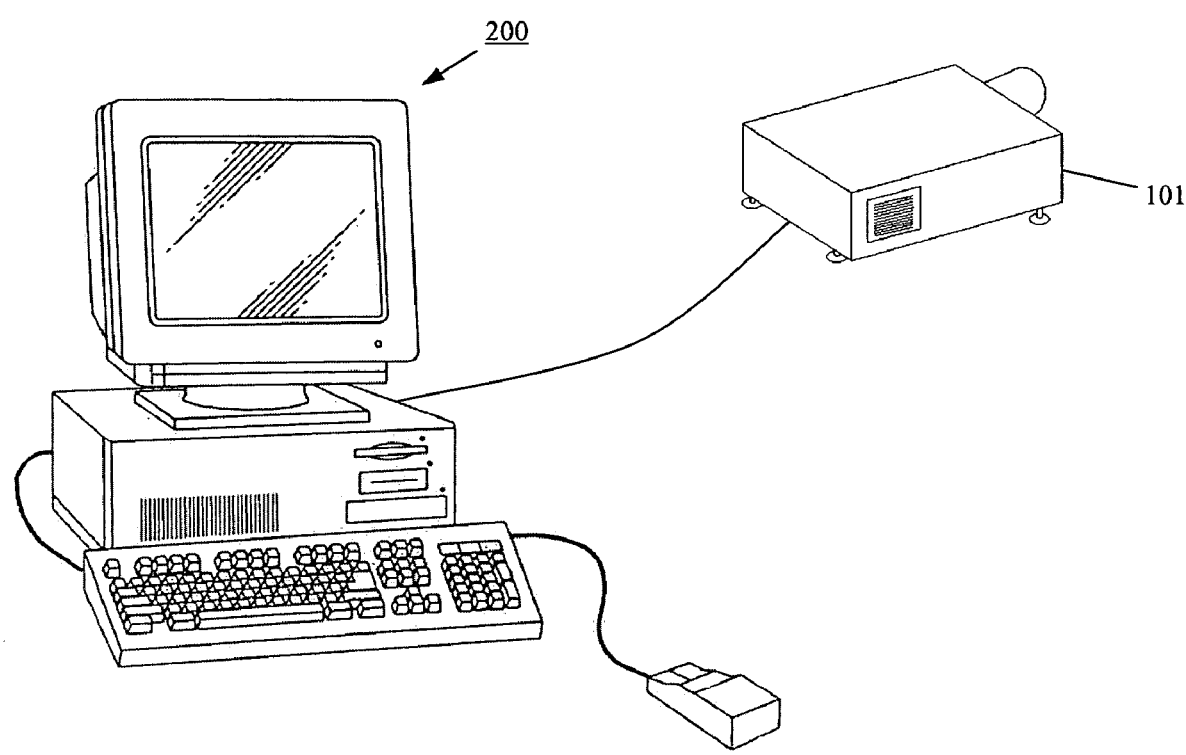
FIG. 2 is a representative view of an apparatus for color-characterization of a display device.

Referring now to FIG. 2, a representative view of an apparatus for color-characterization of a display device is shown. Computing equipment 200 uses the data pairs within the provided MOP to construct the color transformation model for display device 101. Computing equipment 200 preferably includes a computer program which can be used to read the MOP and perform an initial analysis on the set of measurements to determine what the non-uniform sampling grid is, and what the ramps are. A simple algorithm exists for this task, the pseudo-code of which is listed below:

For each (Sample data)
   If (R, G, B are all equal)
      R is a point in the sampling grid of the non-uniform LUT
   If (G=B=0)
      Sample data is on the red ramp
   If (R=B=0)
      Sample data is on the green ramp
   If (R=G=0)
      Sample data is on the blue ramp The above algorithm assumes that the set of measurements contains a complete non-uniformly spaced sampling of the RGB cube, plus additional measurements on the three ramps, but no other extraneous measurements. In addition, the algorithm determines the sampling grid based on data in the MOP, rather than assuming that the sampling grid is fixed and pre-determined. This accounts for the case in which prior knowledge of the threshold is incorporated into the sampling grid.

After the MOP is analyzed, the color transformation model of the present invention can be constructed. However, it should be noted that even if measurements were sampled in a manner different than that described above, the color transformation model of the present invention can still account for the channel interdependency prevalent in DLP display devices. For example, such a color transformation can be constructed if extensive measurements were made for display device 101 (e.g. a comprehensive 9×9×9=729 sampling points). The sampling of RGB data described above simply reduces the number of data measurements made, while still providing sufficient measurement data for constructing the color transformation model.

Regarding the construction of the color transformation model depicted in FIG. 3, standard matrix model 300 is preferably built before difference model 306. Before constructing the standard matrix model 300, however, the effect of flare should be eliminated. Flare can be defined as the non-zero amount of light produced when the color black is displayed on display device 101. When flare is eliminated, the XYZ measurement of the device value R=G=B=0 is X=Y=Z=—0. Therefore, in order to eliminate flare, the XYZ measurement of R=G=B=0 is subtracted from every measurement, with superscript c denoting the black-corrected measurement, as follows:

$X^c = X - X_{bkpt}$
$Y^c = Y - Y_{bkpt}$
$Z^c = Z - Z_{bkpt}$

Once flare has been eliminated, tristimulus matrix 304 can be constructed as follows:

$$S = \begin{pmatrix} X^c_{r,\max} & X^c_{g,\max} & X^c_{b,\max} \\ Y^c_{r,\max} & Y^c_{g,\max} & Y^c_{b,\max} \\ Z^c_{r,\max} & Z^c_{g,\max} & Z^c_{b,\max} \end{pmatrix}$$

where the subscripts r, g and b represent the channel, and max denotes the ramp point with device value 255.

After the tristimulus matrix is constructed, tone curves 301, 302 and 303 can be built from the measurements of each ramp. For a given ramp, N measurements can be assumed, with device value $(R_i, G_i, B_i)$ and colorimetric measurement $(X_i, Y_i, Z_i)$, $i=1, 2, \ldots, N$. Because each point is on one of the ramps, two of the R, G and B should be 0. For the $i^{th}$ point on the tone curve, the device value $d_i$ is $\max(R_i, G_i, B_i)$. The radiometric scalar $d_i'$ is given by:

$$d_i' = \frac{X^c_i \cdot X^c_N + Y^c_i \cdot Y^c_N + Z^c_i \cdot Z^c_N}{X^c_N \cdot X^c_N + Y^c_N \cdot Y^c_N + Z^c_N \cdot Z^c_N}$$

Figure 4:
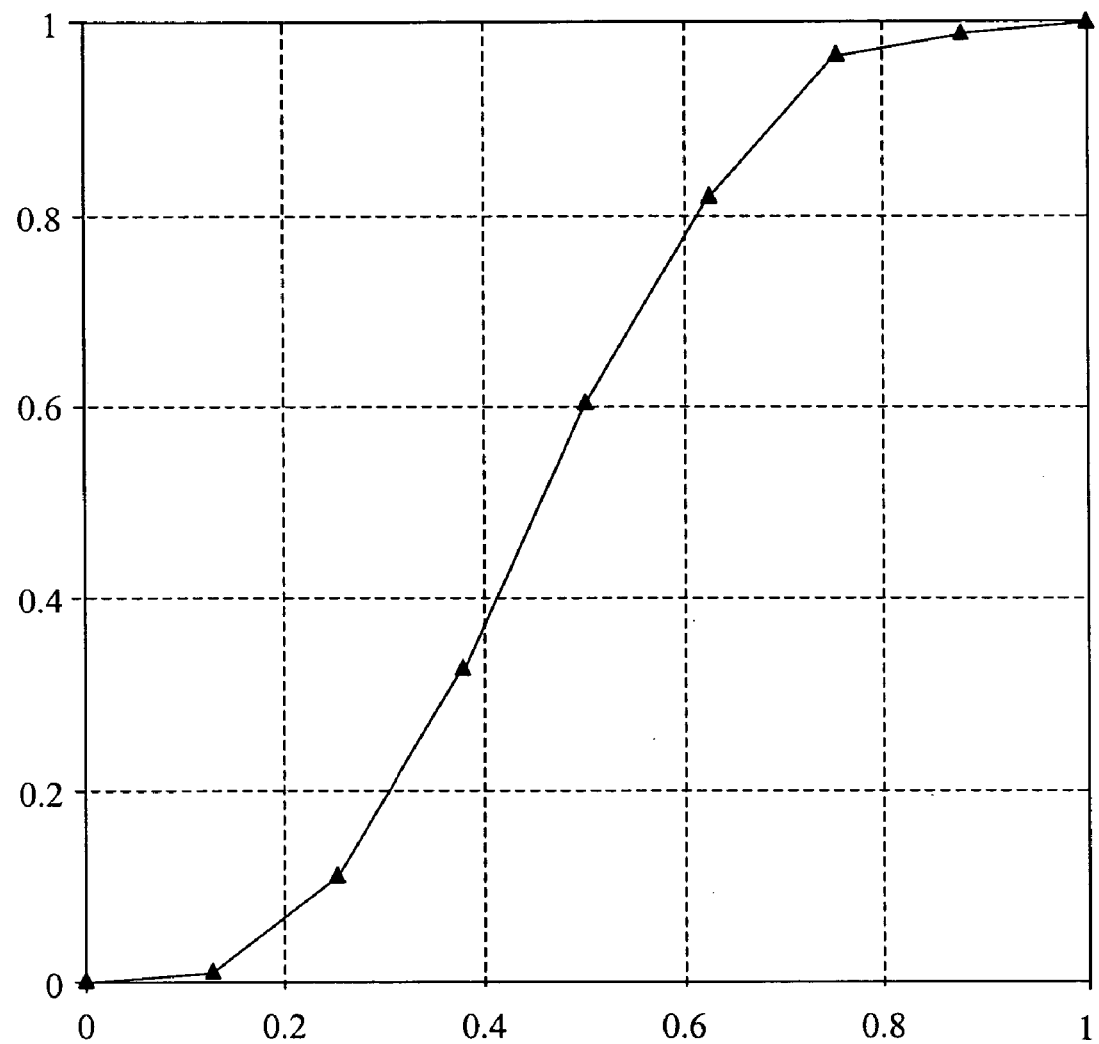
FIG. 4 is a graph depicting a typical tone curve for a channel.

When i=1, $X^c=Y^c=Z^c=0$, and $d_i'=0$, since i=1 corresponds to the black point. On the other hand, when i=N, $d_i'=1$. In other words, each tone curve passes through 0 and 1 at the end points, which is a desirable property. A graph depicting a typical tone curve for a channel is shown in FIG. 4.

Given points $(d_i, d_i')$, tone curves 301, 302 and 303 can be constructed by linear or spline interpolation. Tone curves 301, 302 and 303 are constructed for each of the R, G and B channels, and three transfer functions $\gamma_r(R)$, $\gamma_g(G)$ and $\gamma_b(B)$ are obtained. Thus, the final computational model $(X, Y, Z)^T = M(R, G, B)$, which corresponds to standard matrix model 300, is given by:

$$R' = \gamma_r(R)$$
$$G' = \gamma_g(G)$$
$$B' = \gamma_b(B)$$
$$\begin{pmatrix} X \\ Y \\ Z \end{pmatrix} = S \begin{pmatrix} R' \\ G' \\ B' \end{pmatrix} + \begin{pmatrix} X_{bkpt} \\ Y_{bkpt} \\ Z_{bkpt} \end{pmatrix}$$

After constructing standard matrix model 300, the difference between the output of the standard matrix model and the actual measurement is modeled by difference model 306. The combination of standard matrix model 300 and difference model 306 provides for a more general color model which accounts for the channel interdependency prevalent in DLP display devices.

Figure 5:
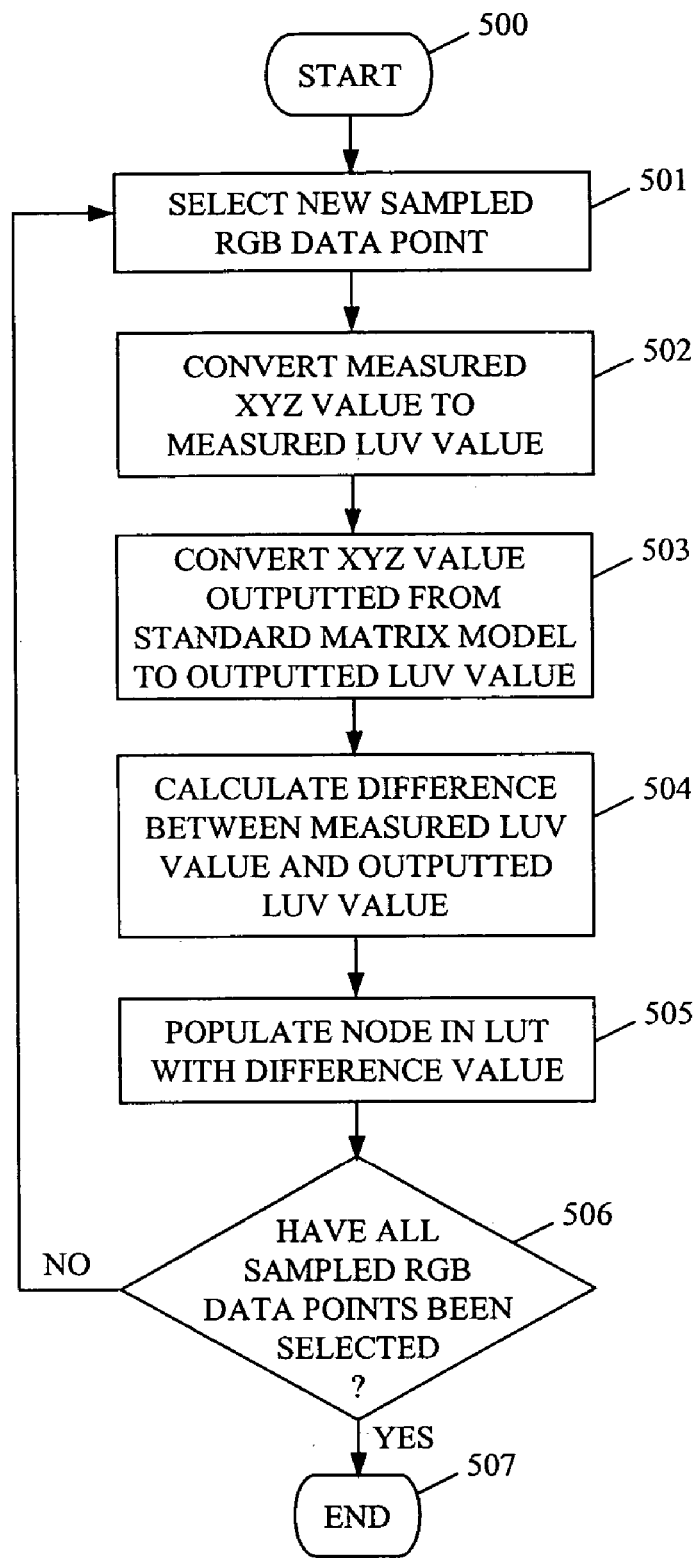
FIG. 5 is a flowchart depicting the construction of a difference model according to one embodiment of the present invention.

FIG. 5 is a flowchart depicting the construction of a difference model according to one embodiment of the present invention. In the preferred embodiment, difference model 306 is implemented as a non-uniform LUT. In constructing the LUT, a difference value is calculated for each of the sampled RGB data points, with the difference values being used to populate the LUT. Following start bubble 500, a sampled RGB data point is selected in step 501. The measured XYZ value corresponding to the selected RGB data point is converted to Luv in step 502. In step 503, the XYZ value outputted by standard matrix model 300 is also converted to Luv. Next, the difference between the measured Luv value and the outputted Luv value is calculated in step 504, and this difference is used to populate the appropriate node in the LUT in step 505. In step 506, an inquiry is made as to whether all of the sampled RGB points have been accounted for. If so, the process ends at end bubble 507. Otherwise, a new sampled RGB data point is selected at step 501, and the process repeats until a difference value has been determined for each of the sampled RGB data points.

The difference between the output of the standard matrix model and the actual measurement is known as the "defect". The defect is generally small, or negligible, for RGB values below a certain threshold. Therefore, sampling more frequently in the range above this threshold retains the non-linear functional form of the defect while reducing the number of measurements, as described above.

In addition, the output space of the LUT is a perceptually linear space, since such an output space allows for linear (tetrahedral) interpolation to be performed on the LUT. In the preferred embodiment, the perceptually linear space of CIELUV is used. As indicated above, the input space for the LUT is the same as that for the standard matrix model, namely the device-dependent color space of RGB in this embodiment.

As seen in FIG. 3, once the standard matrix model 300 and the difference model 306 are constructed, an incoming RGB value passes through two computational pathways. The first pathway is the standard matrix model 300, which comprises tone curves 301, 302 and 303, and which outputs an XYZ value. This is immediately followed by the conversion from XYZ to Luv (via converter 305). The second pathway is the difference model 306, which is preferably implemented as a non-uniform LUT using tetrahedral interpolation. The output of difference model 306 is in Luv space by construction. The sum of the two outputs is calculated to obtain the predicted Luv value. The predicted Luv value is then converted to XYZ (via converter 307), which is the expected output of the color transformation model for display device 101.

Since a value based on standard matrix model 300 is added to a difference value based on difference model 306, which models deviation of standard matrix model 300, the present invention can account for the channel interdependency prevalent in DLP display devices.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for transforming a device-dependent color value in a device-dependent color space of a display device to a perceptually linear color value in a perceptually linear color space, the method comprising:
   a first determining step of determining a first color value in a perceptually linear color space, by applying a matrix model to the device-dependent color value to obtain an XYZ color value in an XYZ color space, the matrix model applying a tone curve correction and a tristimulus matrix to the device-dependent color value, and by converting the XYZ color value into the first color value using a color space converter;
   a second determining step of determining a difference value in the perceptually linear color space, wherein the difference value is determined by applying a difference model to the device-dependent color value, and wherein the difference model models deviation of the matrix model from actual measurements of the display device; and
   an adding step of adding the difference value and the first color value to obtain the perceptually linear color value.

2. A method according to claim 1, wherein the difference model comprises a look-up table (LUT), and wherein the difference value is determined based on linear interpolation of values in the LUT.

3. A method according to claim 2, wherein the values in the LUT are non-uniformly spaced corresponding to non-uniformly spaced actual measurements of the display device.

4. A method according to claim 1, wherein the display device exhibits channel interdependency such that color channels of the device-dependent color value function interdependently during transformation from the device dependent color value to the perceptually linear color value.

5. A method according to claim 4, wherein the channel interdependency is based on the effect of a white filter on a color wheel in the display device.

6. A method according to claim 1, wherein the display device is a projector.

7. A method according to claim 1, further comprising:
   a converting step of converting the perceptually linear color value to the XYZ color space.

8. A method according to claim 1, wherein the perceptually linear color space is CIELUV.

9. An apparatus for converting perceptually linear color values to device-dependent color values, wherein the apparatus utilizes the matrix model, the color space converter and the difference model of claim 1 to convert perceptually linear color values into device-dependent color values usable by the display device.

10. Computer-executable process steps stored on a computer readable medium, said computer-executable process steps for transforming a device-dependent color value in a device-dependent color space of a display device to a perceptually linear color value in a perceptually linear color space, said computer-executable process steps comprising process steps executable to perform a method according to any one of claims 1 to 3, 4, 5 and 6 to 8.

11. A computer-readable medium which stores computer-executable process steps, the computer-executable process steps for transforming a device-dependent color value in a device-dependent color space of a display device to a perceptually linear color value in a perceptually linear color space, said computer-executable process steps comprising process steps executable to perform a method according to any one of claims 1 to 3, 4, 5 and 6 to 8.

* * * * *

UNITED STATES PATENT AND TRADEMARK OFFICE
CERTIFICATE OF CORRECTION

PATENT NO. : 7,148,902 B2
APPLICATION NO. : 10/956445
DATED : December 12, 2006
INVENTOR(S) : Tin It is certified that error appears in the above-identified patent and that said Letters Patent is hereby corrected as shown below:

COLUMN 9:
Line 11, "claim 1 to 3,4,5 and 6 to 8." should read -- claims 1 to 8. --.

COLUMN 10:
Line 8, "claims 1 to 2,4,5 and 6 to 8." should read -- claims 1 to 8. --.

Signed and Sealed this

Eighth Day of April, 2008

JON W. DUDAS
*Director of the United States Patent and Trademark Office*